Patented Mar. 4, 1947

2,416,676

UNITED STATES PATENT OFFICE 2,416,676

PRINTING INK

Dominic J. Bernardi and Robert T. Florence, Bronx, N. Y., assignors to Interchemical Corporation, New York, N. Y., a corporation of Ohio No Drawing. Application March 9, 1944, Serial No. 525,768

3 Claims. (Cl. 106—29)

This invention relates to printing inks of the conventional oxidizing type, and refers particularly to printing inks in which the conventional linseed oil is substituted all or in part by tall oil which has been reacted with lime.

Conventional typographic and lithographic printing inks are essentially fine dispersions of pigment in drying oils such as linseed oil. Many suggestions have been made in an attempt to reduce the cost of these inks without sacrificing their good qualities, and likewise many attempts have been made to overcome some of the difficulty encountered with these inks in various uses. One such improvement is described in our co-pending application Serial No. 492,310, filed June 25, 1943, which discloses the use of pentaerythritol esters of tall oil as the vehicle for a printing ink.

We have now discovered that tall oil reacted with lime, and preferably mixed with a minor percentage of linseed or other drying oil, produces vehicles for printing inks which are characterized by low cost, satisfactory drying as compared with linseed oil, and excellent printability.

The tall oil may be reacted with lime in conventional fashion, by heating either the tall oil alone, or a solution of it in a hydrocarbon solvent, with hydrated lime, or with any equivalent liming agent. Preferably, the temperature is raised to 180 to 200° C., and the lime gradually added, after which the temperature is allowed to rise to 225 to 250° C., and the mass held until the lime is completely reacted. In the indicated range, reaction is complete in 5 to 6 hours.

The product resulting from the reaction will vary in body, increasing with the amount of lime used, and with the resin content of the tall oil, which varies somewhat depending on source. At least 2% of lime is necessary to get a product which will dry at all comparably with linseed oil in printing ink; preferably, the amount of hydrated lime used should be between about 4 and 7% of the weight of the tall oil. Ordinarily, the limed tall oils so produced are somewhat too heavy in body for use as the sole liquid constituents of a printing ink; it is necessary to reduce their body with a minor percentage of linseed or other drying oil.

The calcium used may be replaced in part by zinc or barium, but these metals do not give satisfactory soaps alone. If 2% of lime is present in the soap, however, the residual metal may be substituted.

Example 1

As typical of the effect of the constitution of the tall oil on viscosity, three tall oils were used of low, medium and high resin acid content. These were reacted with 5% hydrated lime by heating to 200° C., adding the lime while allowing the temperature to rise to 220° C., and heating to completion of the reaction for 5 to 6 hours. The viscosities of the three soaps varied as follows:

| Tall oil of— | Viscosity, 30° C. | Ratio of thin drying oil necessary to get approximately 20 poise viscosity at 30° C. |
|---|---|---|
| | Poises | |
| Low resin acid content | 121 | 85 soap—15 oil. |
| Medium resin acid content | 217 | 80 soap—20 oil. |
| High resin acid content | 1,200 | 71.5 soap—28.5 oil. |

Example 2

With 4% of lime, and a low resin acid tall oil, reacted as in Example 1, a product is obtained which has a viscosity of only 60 poises at 30° C. While this is still somewhat high for printing ink, it can be used for very high body inks. Preferably, it is reduced to relatively thin body with a drying oil. Thus—

Example 3

A varnish was made by blending 80 parts by weight of the 4% limed tall oil of Example 2 and 20 parts by weight acid refined linseed oil. The product had a viscosity of 10 poises at 30° C.

The linseed oil can be replaced by other drying oils, such as perilla oil, walnut oil, and the like.

Inks made from this varnish, and linseed oil of identical body, were prepared as follows:

Example 4—Black

|  | Parts by weight |
|---|---|
| Carbon black | 25.0 |
| Cobalt drier | 4.5 |
| Tall oil varnish of Example 3 | 70.5 |

The ink made with the limed tall oil varnish of Example 3 dried in 8 hours, while the linseed ink dried in 7 hours.

Example 5—Red

|  | Parts by weight |
|---|---|
| Barium lithol | 35.0 |
| Paste drier | 5.0 |
| Cobalt drier | 1.0 |
| Tall oil varnish of Example 3 | 59.0 |

The ink made with the limed tall oil varnish of Example 3 dried in 9 hours, while the linseed ink dried in 10 hours.

Example 6—Yellow

| | Parts by weight |
|---|---|
| Chrome yellow | 60.0 |
| Alumina hydrate | 10.0 |
| Paste drier | 6.0 |
| Tall oil varnish of Example 3 | 24.0 |

The ink made with the limed tall oil varnish of Example 3 dried in 6 hours, while the linseed ink dried in 6 hours.

It will be noted that the black ink made with the limed tall oil varnish dried a trifle slower than linseed; the red dried faster, and the yellow dried equally.

Obviously, the examples can be multiplied indefinitely without departing from the scope of the invention. In particular, other pigments may be employed. Varying soaps of varying body may be used. Obviously, other common modifying agents used in minor proportions in oxidizing printing inks may be used—e. g. waxes, surface active agents, the common lubricants and greases, solvents and the like. We consider that our invention resides in the discovery that the cost of oxidizing printing inks—e. g. those made with linseed and other drying oils—can be substantially reduced with no loss in drying speed or printability, by the substitution of limed tall oil for the linseed or other drying oil as the major vehicular constituent.

We claim:

1. A printing ink vehicle of the oxidizing type, which normally contains a drying oil as its major constituent, the major constituent of which is tall oil reacted with from 2 to 7% of its weight of hydrated lime, inks made therefrom being characterized by drying speed and printability approximating that of similar inks in which the limed tall oil is replaced by linseed oil.

2. A printing ink of the oxidizing type, which normally contains a drying oil as its major vehicular constituent, comprising pigment dispersed in a vehicle, the major constituent of which is tall oil reacted with from 2 to 7% of its weight of hydrated lime, the ink being characterized by drying speed and printability approximating that of similar inks in which the limed tall oil is replaced by linseed oil.

3. A printing ink of the oxidizing type, which normally contains a drying oil as its major vehicular constituent, comprising pigment dispersed in a vehicle, the major constituent of which is tall oil reacted with from 2 to 7% of its weight of hydrated lime, and a minor constituent of which is a drying oil substantially thinner in body than the limed tall oil, to reduce the viscosity of the vehicle, the ink being characterized by drying speed and printability approximating that of similar inks in which the limed tall oil is replaced by linseed oil.

DOMINIC J. BERNARDI.
ROBERT T. FLORENCE.

REFERENCES CITED

The following references are of record in the file of this patent:

UNITED STATES PATENTS

| Number | Name | Date |
|---|---|---|
| 2,175,491 | Stresen-Reuter et al. | Oct. 10, 1939 |
| 2,120,588 | Curado | June 14, 1938 |

OTHER REFERENCES

"Application of Tall Oil in the Paint Industry"—Hastings, American Paint Journal, vol. 28, No. 3, Oct. 1943, pages 42, 46, 48 and 50.

"Oil Substitutes for Exterior Paints," Oil, Paint and Drug Reporter, March 8, 1943, pages 5 and 46.